United States Patent
Oshima (10) Patent No.: US 8,766,546 B2
(45) Date of Patent: Jul. 1, 2014

(54) LED DRIVE DEVICE AND LED ILLUMINATING DEVICE

(75) Inventor: Kazunori Oshima, Tokyo (JP)

(73) Assignee: TDK-Lambda Corporation, Tokyo (JP)

( * ) Notice: Subject to any disclaimer, the term of this patent is extended or adjusted under 35 U.S.C. 154(b) by 470 days.

(21) Appl. No.: 13/153,766

(22) Filed: Jun. 6, 2011

(65) Prior Publication Data

US 2012/0306386 A1 Dec. 6, 2012

(51) Int. Cl.
*H05B 37/02* (2006.01)

(52) U.S. Cl.
USPC ............... 315/185 R; 315/209 R; 315/291; 315/307; 315/308

(58) Field of Classification Search
USPC .......... 315/185 R, 209 R, 225, 291, 294, 299, 315/307, 308, 312, 320
See application file for complete search history.

(56) References Cited

U.S. PATENT DOCUMENTS

| | | | |
|---|---|---|---|
| 7,327,051 B2 * | 2/2008 | Ito et al. ..................... | 307/10.8 |
| 7,919,925 B2 * | 4/2011 | Ito et al. ..................... | 315/82 |
| 2009/0187925 A1 * | 7/2009 | Hu et al. ..................... | 719/327 |
| 2009/0189539 A1 * | 7/2009 | Deng et al. .................. | 315/294 |
| 2013/0088169 A1 * | 4/2013 | Ge et al. ..................... | 315/297 |

FOREIGN PATENT DOCUMENTS

| | | |
|---|---|---|
| JP | 2004-126082 | 4/2004 |
| JP | 2007-022104 A | 2/2007 |
| JP | 2007-165161 | 6/2007 |
| JP | 2010-212369 | 9/2010 |

* cited by examiner

*Primary Examiner* — Douglas W Owens
*Assistant Examiner* — Thai Pham
(74) *Attorney, Agent, or Firm* — Fox Rothschild, LLP; Robert J. Sacco (57) ABSTRACT

An LED drive device whose power dissipation can be effectively reduced without halting current supply to an LED row as well as an LED illuminating device with the LED drive device incorporated therein. When an LED 21A making up an LED row 3A has developed a short-circuit fault, a voltage corresponding to a forward voltage which has been applied to the faulty LED 21A is impressed additionally to an FET 31A for electric power consumption thereof to increase to not less than a certain value. At this time, a power limiting circuit 6A varies a potential, being a reference value of a constant current circuit 7A, at a connecting point between voltage dividing resistors 46A, 47A and then continues to supply a certain level of a current IF1 to the LED row 3A so as to keep the remaining fault-free LEDs 22A to 26A lighting. Consequently, in the event of a short-circuit fault of the LED 21A, the adverse effect caused by discontinuing the current supply to the LED row 3A can be swept away.

12 Claims, 5 Drawing Sheets

LED DRIVE DEVICE AND LED ILLUMINATING DEVICE

BACKGROUND OF THE INVENTION

1. Field of the Invention

The present invention relates to an LED drive device which is incorporated in an LED illuminating device employing a plurality of LEDs (Light Emitting Diodes); an LED backlighting device employing the LED illuminating device; an image displaying unit employing the LED backlighting device to display images, etc., and suitably operates especially in the event of an LED fault. The present invention also relates to an LED illuminating device with such LED drive device incorporated therein.

2. Description of the Related Art

Heretofore, with respect to an LED drive device for driving a plurality of LEDs, e.g., Japanese unexamined patent application publication No. 2004-126082 (hereinafter called patent document 1), for example, discloses a technique in which it is detected whether each LED making up an LED sign lamp is faulty or not and then the number of faulty LEDs is counted and if the number of the faulty LEDs is not less than a preset value, an informing device informs such faulty condition to prompt replacement of the LED sign lamp. This technique has been proposed in terms of the fact that it is rather uneconomical to replace or repair the illuminating unit every time only one or several LEDs of a large number of LEDs thereof fail to operate properly, because the illuminating performance as an illuminating unit is hardly impaired in such case. Further, Japanese unexamined patent application publication No. 2007-165161 (hereinafter called patent document 2) discloses a technique in which when any one or more LEDs have developed open faults in a row of series-connected LEDs supplied with a source voltage, zener diodes, e.g., which are connected in parallel with one or a plurality of the LEDs and thereby act as a current bypass means, are allowed to conduct to prevent the whole of the LEDs from being turned off.

SUMMARY OF THE INVENTION

According to the conventional technique disclosed in the patent document 1, the faulty condition is not informed by the informing device until a certain number of the LEDs fail to operate properly. Further, no consideration is given to the protection of an LED drive device particularly in the event of a short-circuit fault of the LED.

Furthermore, according to the conventional technique disclosed in the patent document 2, at the time of the open fault of the LED, the current bypass means allows the current that was flowing into the faulty LED to bypass the faulty LED and then other normal LEDs to keep on lighting. The bypass means, however, does not act in the event of a short-circuit fault of the LED, leading to the likelihood of eventually increasing the power dissipation of the LED drive device. Accordingly, as is the case with the technique disclosed in the patent document 1, there is the possibility of being unable to effectively protect the LED drive device in the event of a short-circuit fault of the LED.

To address such issue, an LED driving IC corresponding to a general LED drive device is provided therein with a protection circuit utilizing the phenomenon that when any LED making up an LED row has given rise to a short-circuit fault from any cause, a forward voltage Vf needed in the LED row having the faulty LED decreases and a power dissipation corresponding to the decrease in the voltage Vf occurs in the IC. Specifically, there are proposed a device equipped with an overheat protection function operating based on a temperature judgment of a package forming a shell of an LED driving IC and a device equipped with an overvoltage protection function for detecting a voltage of an internal circuit of the IC which drives the pertinent LED row to halt the operation of the IC.

Both of the overheat protection function and the overvoltage protection function, however, operate to halt a current supply to the pertinent LED row and hence they may cause the problem that the total luminance of the whole of an LED illuminating unit is lowered.

The present invention has been made with the above problem focused on, and therefore it is an object of the present invention to provide an LED drive device capable of effectively decreasing the power dissipation of the device without halting a current supply to an LED row.

In order to attain the above object, according to the present invention, there is provided an LED drive device in which a drive voltage is applied to an LED row made up of a plurality of LEDs series-connected. The LED drive device comprises a constant current circuit including a semiconductor element connected in series with the LED row to control the semiconductor element by comparing a detected value obtained by detecting a current flowing through the LED row with a reference value and thereby keep the current flowing through the LED row constant, and a power limiting circuit for varying a reference value so that when the electric power consumption of the semiconductor element reaches not less than a certain value, the electric power consumption of the semiconductor element becomes lower than an allowable power dissipation of the semiconductor elements with the LEDs allowed to keep on lighting up.

When an LED making up the LED row has developed a short-circuit fault from any cause, a voltage corresponding to the forward voltage which had been applied to the faulty LED is applied additionally to the semiconductor element connected with the LED row including the faulty LED and then the electric power consumption of the semiconductor element increases up to not less than a certain value. At this time, the power limiting circuit varies the reference value of the constant current circuit so that an actual power dissipation or loss of the semiconductor element becomes lower than the allowable power dissipation thereof, thus permitting the power dissipation of the semiconductor element, eventually that of the device itself to be effectively reduced. Besides, the power limiting circuit supplies a certain magnitude of current to the LED row so as to allow the remaining fault-free LEDs in the LED row to continue to light up, and hence, in the event of a short-circuit fault, an adverse effect of halting the current supply to the LED row can be swept away.

Further, in this case, it is desirable that when the electric power consumption of the semiconductor element has reached not less than a certain value, the power limiting circuit varies the reference value so as to enable a maximal current to flow into the semiconductor element within the range of electric power consumption lower than an allowable power dissipation of the semiconductor element.

As a result, when an LED making up the LED row has developed a short-circuit fault, the power limiting circuit varies the reference value so that a current flowing through the semiconductor element, eventually a current flowing through the LED row is maximized within the range of allowing the actual power dissipation of the semiconductor element stay lower than the allowable power dissipation. Accordingly, it becomes possible for the remaining fault-free LEDs to continue to light up at as high a luminance as possible.

Further, in this case, the constant current circuit is desirably equipped with a current detector for detecting a current flowing through the LED row and besides the power limiting circuit is desirably equipped with a calculator for calculating electric power consumption of the semiconductor element using a detected value obtained by the current detector and a voltage across the semiconductor element.

Accordingly, a value of a current which is required for calculating the electric power consumption of the semiconductor element and flows through the semiconductor element can be obtained utilizing the current detector of the current constant circuit, thus enabling the circuit configuration to be simplified.

Besides, the constant current circuit in this case is desirably equipped with an op amp or comparator for controlling the semiconductor element by a voltage obtained by comparing a voltage of the detected value and a voltage of the reference value.

Accordingly, the constant current circuit can be formed into a circuit configuration suitable particularly for the semiconductor element of a voltage control type.

Further, the constant current circuit in this case is desirably equipped with a current mirror circuit for flowing a current across terminals of the semiconductor element in proportion to a current value obtained by comparing the detected value and the reference value.

As a result, the constant current circuit can be formed into a circuit configuration suitable particularly for the semiconductor element of a current control type.

Furthermore, the LED drive device is desirably so configured that a plurality of the LED rows is connected and each of a plurality of the LED rows is provided with the constant current circuit and the power limiting circuit.

As a result, even when an LED in a specified LED row has developed a short-circuit fault, the remaining fault-free LEDs in the LED row keep on lighting up. Hence, the decrease in luminance of the whole LED unit comprising a plurality of LED rows can be minimized.

Moreover, the LED drive device thus configured and the LED rows may be assembled together to make up an LED illuminating device.

According to the LED drive device and the LED illuminating device, the power dissipation of the devices can be effectively reduced without halting a current supply to the LED row.

Further, by adopting a suitable configuration of the power limiting circuit, it becomes possible for the remaining fault-free LEDs to continue to light at as high a luminance as possible.

Furthermore, even if an LED in a specified LED row has developed a short-circuit fault in an LED unit comprising a plurality of LED rows, the decrease in the luminance of the whole of the LED unit comprising a plurality of LED rows can be minimized.

Moreover, the current value which is required for calculating the electric power consumption of the semiconductor element and flows through the semiconductor element can be obtained utilizing the current detector of the constant current circuit, thus permitting the circuit configuration to be simplified.

Besides, the constant current circuit can be formed into the circuit configuration suitable for any one of the current-control and voltage-controlled semiconductor elements.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE INVENTION

Figure 1:
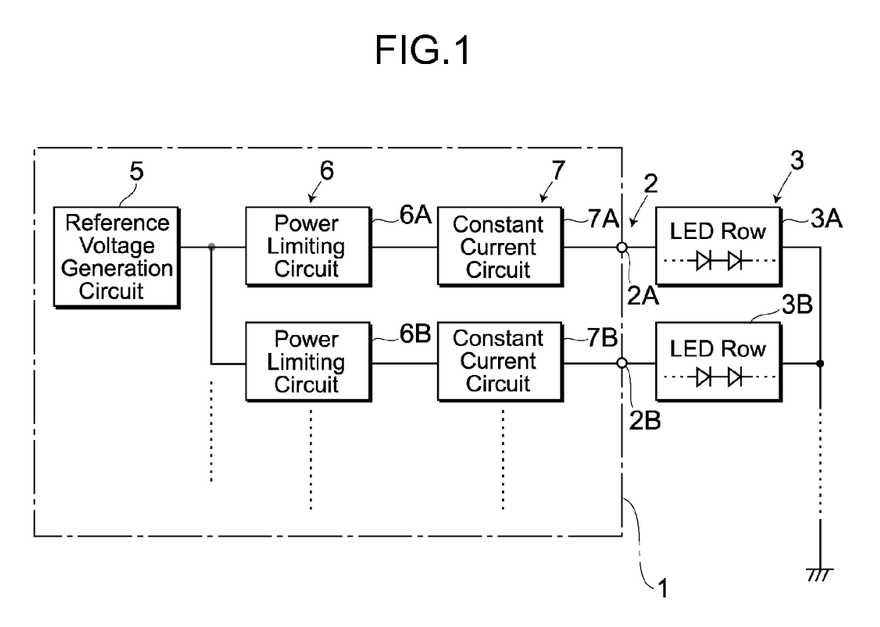
FIG. 1 is a block diagram of an LED drive device illustrating one embodiment in the present invention.

Hereunder is a description of a preferred embodiment of the present invention with reference to the accompanying drawings. FIG. 1 shows an outline configuration of an LED drive device proposed by the present invention. In FIG. 1, numeral symbol 1 denotes an LED drive device with output terminals 2. Here, N pieces of LED rows 3 (3A, 3B, . . . , 3N) comprising a plurality of series-connected LEDs are connected between N pieces of output terminals 2A, 2B, . . . , 2N and a ground line.

An inside of the LED drive device 1 includes a reference voltage generation circuit 5, a power limiting circuit 6 and a constant current circuit 7. The reference voltage generation circuit 5 generates a drive voltage, that is, a reference voltage for enabling each LED making up the LED row 3 to light up, while the reference voltage is supplied to the LED rows 3A, 3B, . . . , 3N via each of the output terminals 2A, 2B, . . . , 2N. Further, the power limiting circuit 6 and the constant current circuit 7 are connected in series with each other between the reference voltage generation circuit 5 and the output terminals 2A, 2B, . . . , 2N. In the present embodiment, series circuits comprising the power limiting circuits 6A, 6B, . . . , 6N, the constant current circuits 7A, 7B, . . . , 7N, and the LED rows 3A, 3B, . . . , 3N, respectively are connected in parallel with the reference voltage generation circuit 5 connected in common with these circuits. In addition, the power limiting circuits 6A, 6B, . . . , 6N, the constant current circuits 7A, 7B, . . . , 7N, and the LED rows 3A, 3B, . . . , 3N may be connected in a different order from that shown in FIG. 1.

The power limiting circuit 6 is a novel scheme added to in the present embodiment. Here, the N pieces of the power limiting circuits 6A, 6B, . . . , 6N are provided for each of the LED rows 3A, 3B, . . . , 3N. The power limiting circuits 6A, 6B, . . . , 6N monitor whether or not a faulty condition has occurred in each of the LED rows 3A, 3B, . . . , 3N corresponding to each of the power limiting circuits and when any faulty condition has occurred, the power limiting circuits limit electric powers supplied to any of the LED rows 3A, 3B, . . . , 3N depending on the faulty condition which has occurred. The constant current circuit 7 stabilizes a supply current to the LED row 3 and as is the case with the foregoing power limiting circuits 6A, 6B, . . . , 6N, the N pieces of the constant current circuits 7A, 7B, . . . , 7N are provided for each of the LED rows 3A, 3B, . . . , 3N.

Specifically according to the present embodiment, the power limiting circuit 6A, connected with the constant current circuit 7A, includes a function which detects the increase in power dissipation of the constant current circuit 7A connected with the LED row 3A when among a plurality of the LED rows 3A, 3B, . . . , 3N, one or more LEDs, e.g., in the LED row 3A, are short-circuited and have characteristic variations as compared to the other LEDs and thereby reduces a current flowing through the LED row 3A so that the power dissipation of the constant current circuit 7A becomes lower than the preset allowable power dissipation of the constant current circuit 7A with other LEDs held not to be turned off. Another power limiting circuits 6B, . . . , 6N incorporated in the LED drive device 1 are similarly equipped with this function.

Figure 2:
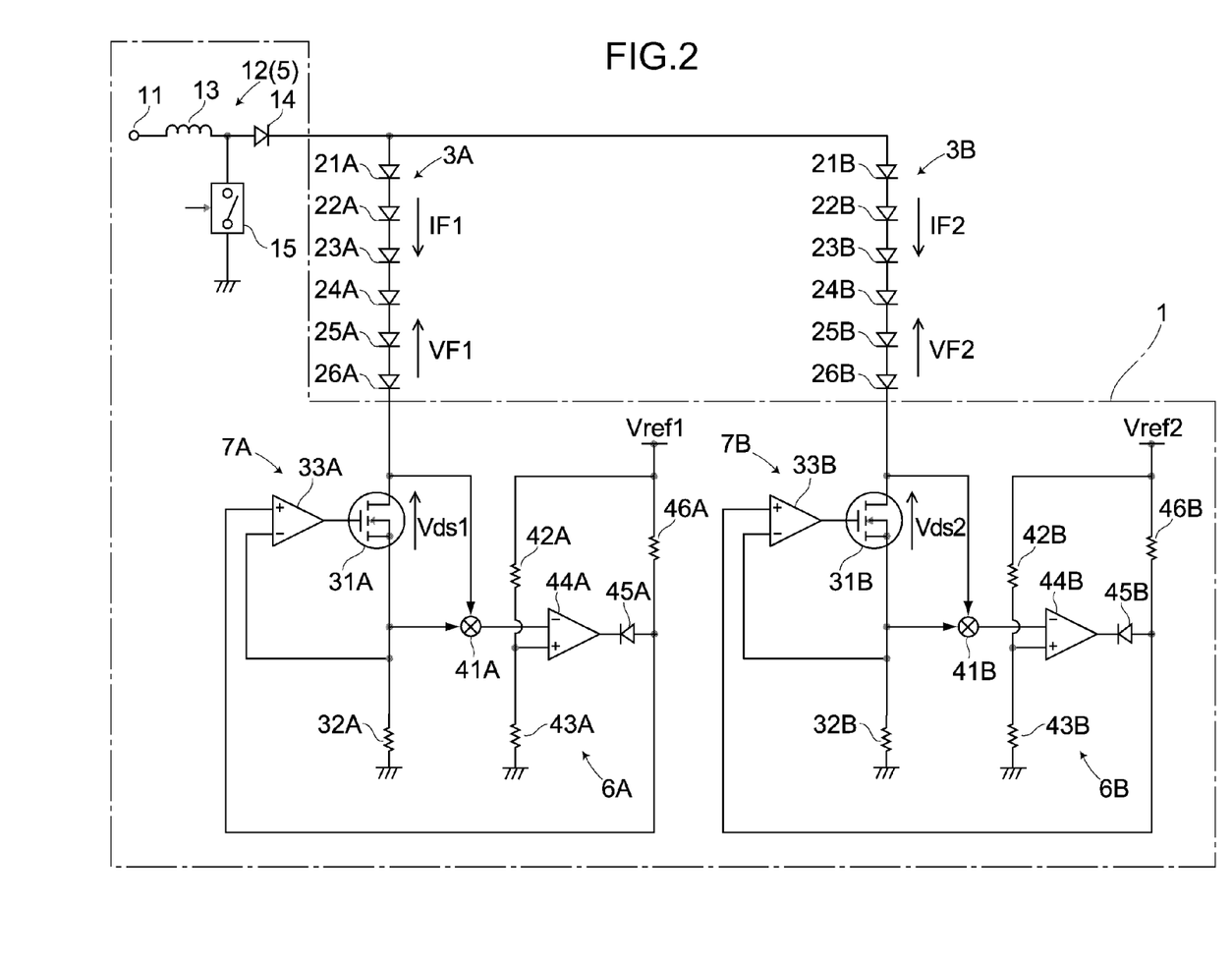
FIG. 2 is a circuit diagram of an ideal LED drive device illustrating one embodiment in the present invention.
Figure 3:
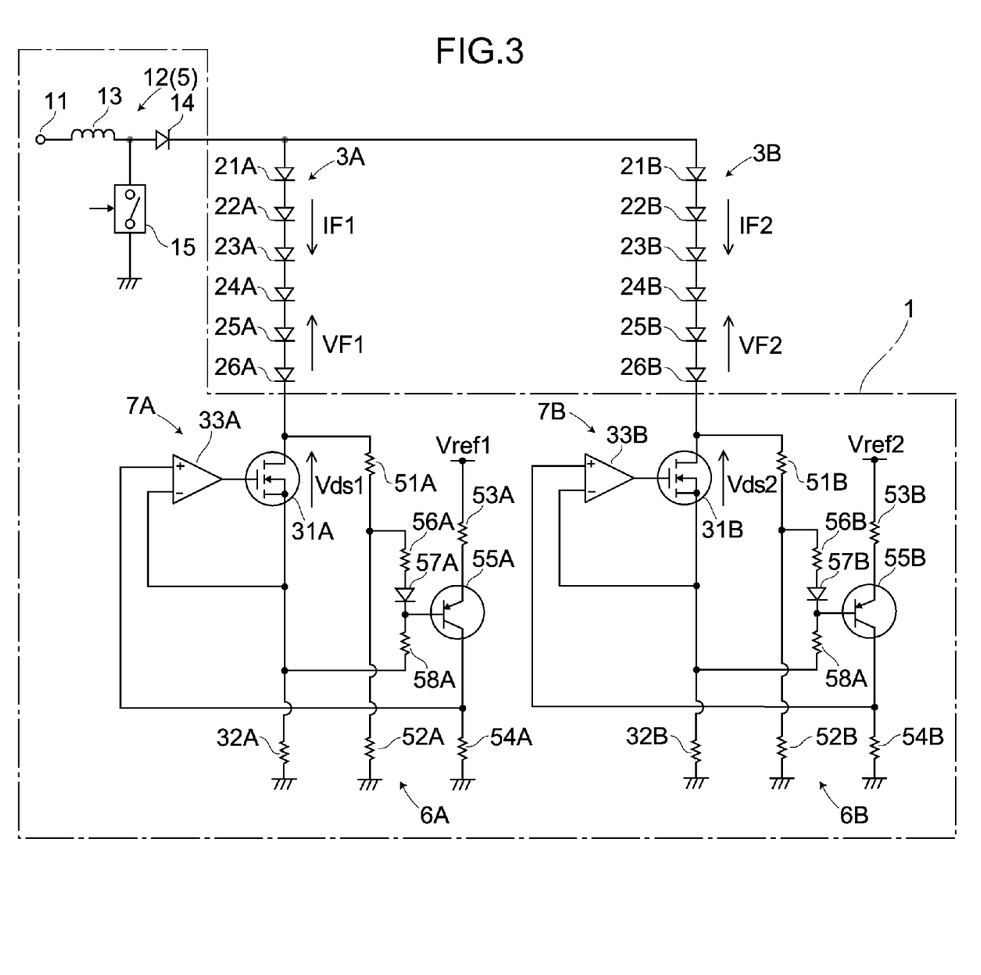
FIG. 3 is a circuit diagram of an actual LED drive device illustrating one embodiment in the present invention.

Next is a description of a detailed circuit configuration of the LED drive device 1 based on FIG. 2 and FIG. 3. FIG. 2 shows an LED drive device 1 as an ideal circuit. In FIG. 2, numeral symbols 11 denote an input terminal to which an input voltage is applied from an electric power supply not shown and numeral symbols 12 denote a boost converter circuit for converting an input voltage from the input terminal 11 into a boosted voltage acting as a reference voltage. This boost converter circuit 12 corresponds to the reference voltage generation circuit 5. The boost converter circuit 12 is made up of, as is well-known, a series-circuit of an inductor 13 connected with an input voltage line and a diode 14, and a switching element 15 connected between a connecting point of the inductor 13 and diode 14 and a ground line. During the on-state period of the switching element 15, the input voltage is applied to the inductor 13, which then stores energy, and during the off-state period of the switching element 15, the energy stored in the inductor 13 is allowed to superpose the energy provided from the electric power supply and then the superposed energy is sent to the diode 14. Thus, the boosted voltage higher than the input voltage is generated between the cathode of the diode 14 and the ground line.

In addition, as the foregoing switching element 15, a semiconductor element with a control terminal, desirably such as a bipolar transistor and a MOSFET can be employed. Further, for the sake of reducing ripple components of the boosted voltage, a smoothing capacitor may be connected between the cathode of the diode 14 and the ground line. Furthermore, a control circuit (not shown) which supplies a pulse drive signal with a conducting duration depending on the boosted voltage to the control terminal of the switching element 15 to stabilize the boosted voltage may be incorporated in the LED drive device 1.

The point is that the reference voltage generation circuit 5 may be capable of supplying a reference voltage desirable for all the LED rows 3A, 3B, . . . , 3N. In substitute for the boost converter circuit 12 shown in FIG. 2, e.g., various types of converters such as a buck converter and a buck-boost converter, e.g., can be also adopted. Further, such a configuration may be applicable as one in which the LED drive device 1 is not equipped with the reference voltage generation circuit 5 and has the reference voltage generation circuit 5 as an outside unit.

In FIG. 2, two LED rows 3A, 3B are shown as a load of the LED drive device 1. Obviously, the number of the LED row 3 is not limited to that number, two. Here, six series-connected LEDs 21A to 26A are shown as the LED row 3A and six series-connected LEDs 21B to 26B are shown as other LED row 3B. The number of LEDs in each of the LED rows 3A, 3B, however, is also not limited in particular.

The series circuit of the LED row 3A and constant current circuit 7A is connected between the cathode of the diode 14 and the ground line. Similarly, a series circuit of the other LED row 3B and constant current circuit 7B is also connected between the cathode of the diode 14 and the ground line. Accordingly, the boosted voltage generated in the boost converter circuit 12 is applied to each of these series circuits. The constant current circuit 7A is made up of a semiconductor element with a control terminal. The constant current circuit 7A includes a series circuit, connected between the LED row 3A and the ground line, comprising a MOSFET 31A for controlling a current flowing into the LED row 3A and a current detection resistor 32A for detecting a current flowing through the LED row 3A to convert the current into a detected voltage based on the LED current. Further, the constant current circuit 7A includes an op amp 33A with a differential amplifier circuit which generates a control voltage of the FET 31A, being a gate voltage thereof, from a compared result between a detected voltage value obtained in the current detection resistor 32A and a detected voltage value obtained in a power limiting circuit 6A described below and then allows the FET 31A to perform constant current drive of the LED 3A. Another constant current circuit 7B is also made up of a semiconductor element with a control terminal. The constant current circuit 7B includes a series circuit, connected between the LED row 3B and the ground line, comprising a MOSFET 31B for controlling a current flowing into the LED row 3B and a current detection resistor 32B for detecting a current flowing through the LED row 3B to convert the current into a detected voltage based on the LED current. Further, the constant current circuit 7B includes an op amp 33B with a differential amplifier circuit which generates a control voltage of the FET 31B, being a gate voltage thereof, from a compared result between a detected voltage value obtained in the current detection resistor 32B and a detected voltage value obtained in a power limiting circuit 6B described below and then allows the FET 31B to perform constant current drive of the LED 3B.

The power limiting circuits 6A, 6B are connected with the constant current circuits 7A, 7B, respectively. The power limiting circuit 6A is made up of a multiplying circuit 41A for multiplying a value of a voltage Vds1 across the FET 31A, that is, a voltage between drain and source thereof and a value of a current flowing through the FET 31A together, a voltage dividing resistors 42A, 43A for dividing a reference voltage VREF1, an op amp 44A for comparing an output value from the multiplying circuit 41A and the value of a voltage generated at a connecting point between the voltage dividing resistors 42A, 43A, a diode 45A whose cathode is connected with the output terminal of the op amp 44A, and a resistor 46A whose one end is connected with the line of the reference voltage VREF1 and whose other end is connected with the anode of the diode 45A. Besides, the power limiting circuit 6A supplies a voltage generated at the other end of the resistor 46A to the input terminal of the op amp 33A. As a result, in order to detect the power dissipation of the FET 31A, eventually the power dissipation of the constant current circuit 7A, the multiplying circuit 41A multiplies a drain-source voltage Vds1 and the current flowing through the FET 31A together. Then, when the electric power value obtained by the multiplication exceeds a preset value determined by the dividing resistors 42A, 43A, the op amp 44A varies a voltage level generated at the other end of the resistor 46A and thereby if any of the LEDs 21A to 26A has been short-circuited, a current IF1 flowing into the LED row 3A can be reduced.

Similarly, another power limiting circuit 6B is made up of a multiplying circuit 41B for multiplying a value of a voltage Vds2 across the FET 31B, that is, a voltage between drain and source thereof and a value of a current flowing through the FET 31A together, a voltage dividing resistors 42B, 43B for dividing a reference voltage VREF2, an op amp 44B for comparing an output value from the multiplying circuit 41B and a voltage value generated at a connecting point between the voltage dividing resistors 42B, 43B, a diode 45B whose cathode is connected with an output terminal of the op amp 44B, and a resistor 46B whose one end is connected with the line of the reference voltage VREF2 and whose other end is connected with the anode of the diode 45B. Besides, the power limiting circuit 6B supplies a voltage generated at the other end of the resistor 46B to an input terminal of the op amp 33B. As a result, in order to detect the power dissipation of the FET 31B, eventually the power dissipation of the constant current circuit 7B, the multiplying circuit 41B multiplies a drain-source voltage Vds2 and the current flowing through the FET 31B together and then when the electric power value obtained by the multiplication exceeds a preset value determined by the dividing resistors 42B, 43B, the op amp 44B varies a voltage level generated at the other end of the resistor 46B and thereby if any of the LEDs 21B to 26B has been short-circuited, a current IF2 flowing into the LED row 3B can be reduced.

In addition, in the power limiting circuit 6A, 6B, as the multiplying circuit 41A, 42B acting as a calculator for calculating the electric power loss of the FETs 31A, 31B, a microcomputer, e.g., may be available.

The LED drive device 1 in the present embodiment and one or more LED rows 3 can be incorporated to form an LED illuminating device for illuminating an object (not shown). Accordingly, a configuration of the LED illuminating device leads to one including the LED drive device 1 and the LED row 3. Further, the LED illuminating device thus configured is available for an LED backlighting device for emitting light from the backside of a light modulating element such as a liquid crystal panel or the like as well as for an image displaying device using the LED backlighting device.

An operation of the aforementioned configuration is described hereunder. The input voltage applied to the input terminal 11 is boosted due to a switching operation of the switching element 15 included in the boost converter circuit 12. The voltage thus boosted is supplied from the boost converter circuit 12 to both of the LED rows 3A, 3B, the voltage serving as a reference voltage for driving the LEDs 21A-26A and the LEDs 21B-26B.

Here, a state in which each of the LED rows 3A and 3B has six series-connected LEDs is referred to as a normal connection. When the LEDs 21A-26A of the LED row 3A and the LEDs 21B-26B of the LED row 3B are all driven under a normal condition, a forward voltage VF1 obtained by summing voltages of all the LEDs 21A-26A making up the LED row 3A is substantially equivalent to a forward voltage VF2 obtained by summing voltages of all the LEDs 21B-26B making up the LED row 3B. At that time, both the drain-source voltage Vds1 of the FET 31A and the drain-source voltage Vds2 of the FET 31B substantially become 0V and hence power dissipations in the FET 31A and the FET 31B are hardly generated. Also, at that time, in the power limiting circuit 6A, an output value of the multiplying circuit 41A is lower than a potential of a connection point of voltage dividing resistors 42A, 43A, and an output of the op amp 44A switches to an H (high) level, thereby causing the diode 45A to become non-conductive, thus allowing the reference voltage VREF1 unchanged through the resistor 46A to be supplied to the constant current circuit 7A. The constant current circuit 7A detects the current flowing through the LED row 3A with the current detection resistor 32A to convert the current value thus detected into a voltage value and controls the gate voltage of the FET 31A based on a comparison result obtained by comparing the thus converted voltage value with a voltage value supplied from the power limiting circuit 6A. In this way, unless a fault or the like has occurred in any one of the LEDs 21A-26A, the constant current IF1 predetermined by the reference voltage VREF1 is caused to flow into the LEDs 21A-26A of the LED row 3A.

Further, in the power limiting circuit 6B, an output value of the multiplying circuit 41B is also lower than a potential of a connection point of voltage dividing resistors 42B, 43B, and an output of the op amp 44B switches to the H level, thereby causing the diode 45B to become non-conductive, thus allowing the reference voltage VREF2 unchanged through the resistor 46B to be supplied to the constant current circuit 7B. The constant current circuit 7B detects the current flowing through the LED row 3B with the current detection resistor 32B to convert a current value thus detected into a voltage value and controls the gate voltage of the FET 31B based on a comparison result obtained by comparing the thus converted voltage value with a voltage value supplied from the power limiting circuit 6B. In this way, unless a fault or the like has occurred in any one of the LEDs 21B-26B, the constant current IF2 predetermined by the reference voltage VREF2 is caused to flow into the LEDs 21B-26B of the LED row 3B.

Here, with regard to a plurality of the LED rows 3A, 3B, if, for example, an LED 25B and an LED 26B of the LED row 3B have developed a short-circuit fault, the summed forward voltage VF2 of the LED row 3B decreases. The constant current circuit 7B corresponding to the LED row 3B controls the FET 31B in such a manner that the current IF2 flowing through the LED row 3B remains constant, thereby causing the drain-source voltage Vds2 of the FET 31B to increase. At that time, there is generated a power dissipation P expressed as a product of the drain-source voltage Vds2 of the FET 31B and the current IF2 flowing through the LED row 3B ($P=Vds2 \times IF2$).

According to the present embodiment, a level of a voltage value supplied to the op amp 33B of the constant current circuit 7B from the power limiting circuit 6B is lowered in such a manner that an actual power dissipation P generated in the FET 31B remains less than a power dissipation allowed thereby, thus reducing the current IF2 flowing into the LED row 3B. Specifically, an output value equivalent to the power dissipation P is generated from the multiplying circuit 41B when the drain-source voltage Vds2 of the FET 31B increases. When the output value from the multiplying circuit 41B becomes higher than the potential of the connection point of the voltage dividing resistors 42B, 43B, the diode 45B becomes conductive with an output value of the op amp 44B being reduced, thereby lowering a potential of other end of the resistor 46B. The constant current circuit 7B to which a voltage value of the other end of the resistor 46B is applied compares the voltage value of the other end of the resistor 46B with a voltage value detected using the current detection resistor 32B, thus narrowing down the current IF2 flowing into the LED row 3B in such a way that the power dissipation generated in the FET 31B remains lower than the allowable power dissipation of the FET 31B and a value of the current IF2 capable of flowing through the FET 31B is preferably as large as possible.

In this way, among a plurality of the LED rows 3A, 3B, when the drain-source voltage Vds2 of the FET 31B connected to the LED row 3B has become a predetermined value or more, the reference voltage supplied to the constant current circuit 7B can be changed only in the LED row 3B, based on the drain-source voltage Vds2. Further, even when a plurality of the LEDs 21B-26B have developed a short-circuit fault, the power dissipation in the FET 31B remains a constant value less than the allowable power dissipation thereof, thus preventing the breakage of the FET 31B due to heat. Furthermore, when the power dissipation in the FET 31B is within an allowable range, the current IF2 of the LED row 3B does not become zero and the current IF2 of a certain level flows through the LED row 3B to thereby allow fault-free LEDs 21B-21B to be continuously lighted, thus allowing the LED rows 3 to be lighted up more brightly as a whole than ever before.

FIG. 3 is a circuit diagram showing an example of an actual LED drive device 1. According to FIG. 3, the power limiting circuit 6A comprises: voltage dividing resistors 51A, 52A connected across the series circuit of the FET 31A and the current detection resistor 32A; voltage dividing resistors 53A, 54A for dividing the reference voltage VREF1; a transistor 55A connected to the middle portion of a series circuit of the voltage dividing resistors 53A, 54A; a series circuit of a resistor 56A and a diode 57A connected between the connection point of the voltage dividing resistors 51A, 52A and a base of the transistor 55A; and a resistor 58A connected between one end of the current detection resistor 32A and the base of the transistor 55A. The power limiting circuit 6A serves to supply to an input terminal of the op amp 33A a voltage generated in a connection point of a collector of the transistor 55A and the voltage dividing resistor 54A. Accordingly, the voltage dividing resistors 51A, 52A divide the drain-source voltage Vds1 of the FET 31A in order to detect the power dissipation in the FET 31A, namely, the power dissipation in the constant current circuit 7A. A voltage level of the base of the transistor 55A is varied based on a voltage value thus divided, thus making it possible to reduce the current IF1 flowing into the LED row 3A when any one of the LEDs 21A-26A has developed a fault.

Similarly, the power limiting circuit 6B comprises: voltage dividing resistors 51B, 52B connected to the middle portion of the series circuit of the FET 31B and the current detection resistor 32B; voltage dividing resistors 53B 54B for dividing the reference voltage VREF2; a transistor 55B connected to the middle portion of a series circuit of the voltage dividing resistors 53B, 54B; a series circuit of a resistor 56B and a diode 57B connected between the voltage dividing resistors 51B, 52B and a base of the transistor 55B; and a resistor 58B connected between one end of the current detection resistor 32B and the base of the transistor 55B. The power limiting circuit 6B serves to supply to an input terminal of the op amp 33B a voltage generated in a connection point of a collector of the transistor 55B and the voltage dividing resistor 54B. Accordingly, the voltage dividing resistors 51B, 52B divide the drain-source voltage Vds2 of the FET 31B in order to detect the power dissipation in the FET 31B, namely, the power dissipation in the constant current circuit 7B. A voltage level of the base of the transistor 55B is varied based on a voltage value thus divided, thus making it possible to reduce the current IF2 flowing into the LED row 3B when any one of the LEDs 21B-26B has developed a fault.

An operation of the LED drive device 1 shown in FIG. 3 is described hereunder. As described earlier, the power dissipations in the FET 31A, 31B are hardly generated, when the LEDs 21A-26A of the LED row 3A and the LEDs 21B-26B of the LED row 3B are all driven under the normal condition. At that time, in the power limiting circuit 6A, a potential of a connection point of the voltage dividing resistors 51A, 52A substantially becomes 0V, and there is supplied directly to the constant current circuit 7A a voltage obtained by dividing the reference voltage VREF1 with the preset voltage dividing resistors 53A, 54A. The constant current circuit 7A detects the current flowing through the LED row 3A with the current detection resistor 32A to covert a current value thus detected into a voltage value and controls the gate voltage of the FET 31A based on the comparison result obtained by comparing the thus converted voltage value with the voltage value supplied from the power limiting circuit 6A. In this way, unless a fault or the like has occurred in any one of the LEDs 21A-26A, the constant current IF1 predetermined by the reference voltage VREF1 and voltage dividing resistors 46A, 47A is caused to flow into the LEDs 21A-26A of the LED row 3A.

Further, with regard to the power limiting circuit 6B, a potential of a connection point of the voltage dividing resistors 51B, 52B substantially becomes 0V, and there is supplied directly to the constant current circuit 7B a voltage obtained by dividing the reference voltage VREF2 with the preset voltage dividing resistors 53B, 54B. The constant current circuit 7B detects the current flowing through the LED row 3B with the current detection resistor 32B to convert a current value thus detected into a voltage value and controls the gate voltage of the FET 31B based on the comparison result obtained by comparing the thus converted voltage value with the voltage value supplied from the power limiting circuit 6B. In this way, unless a fault or the like has occurred in any one of the LEDs 21B-26B, the constant current IF2 predetermined by the reference voltage VREF2 and voltage dividing resistors 46B, 47B is caused to flow into the LEDs 21B-26B of the LED row 3B.

Here, among a plurality of the LED rows 3A, 3B, if, for example, the LED 25B and LED 26B of the LED row 3B have developed a short-circuit fault, the level of the voltage value supplied to the op amp 33B of the constant current circuit 7B from the power limiting circuit 6B is lowered in such a manner that the actual power dissipation P generated in the FET 31B remains less than the allowable power dissipation of the FET 31B, thus reducing the current IF2 flowing into the LED row 3B. Specifically, when the drain-source voltage Vds2 of the FET 31B and the potential of the connection point of the voltage dividing resistors 51B, 52B increase, the diode 57A becomes conductive, and a base voltage of the transistor 55A increases, thus causing a voltage value of a connection point of the collector of the transistor 55A and the voltage dividing resistor 54A to become lower as compared to the normal operation. The constant current circuit 7B to which the voltage value of such connection point is applied, compares the voltage value of the connection point with the voltage value detected using the current detection resistor 32B, thus enabling the current IF2 flowing into the LED row 3B to be narrowed down in such a way that the power dissipation generated in the FET 31B remains lower than the allowable power dissipation of the FET 31B, and the value of the current IF2 flowing through the FET 31B becomes preferably maximum possible one.

In this way, according to FIG. 3, a power limiting circuit can be simply configured by dividing and adding the drain-source voltage Vds2 of the FET 31B and the voltage generated in the resistor 32A due to the current IF flowing into the LED row 3, without employing such a multiplying circuit as an ideal circuit shown in FIG. 2.

Figure 4:
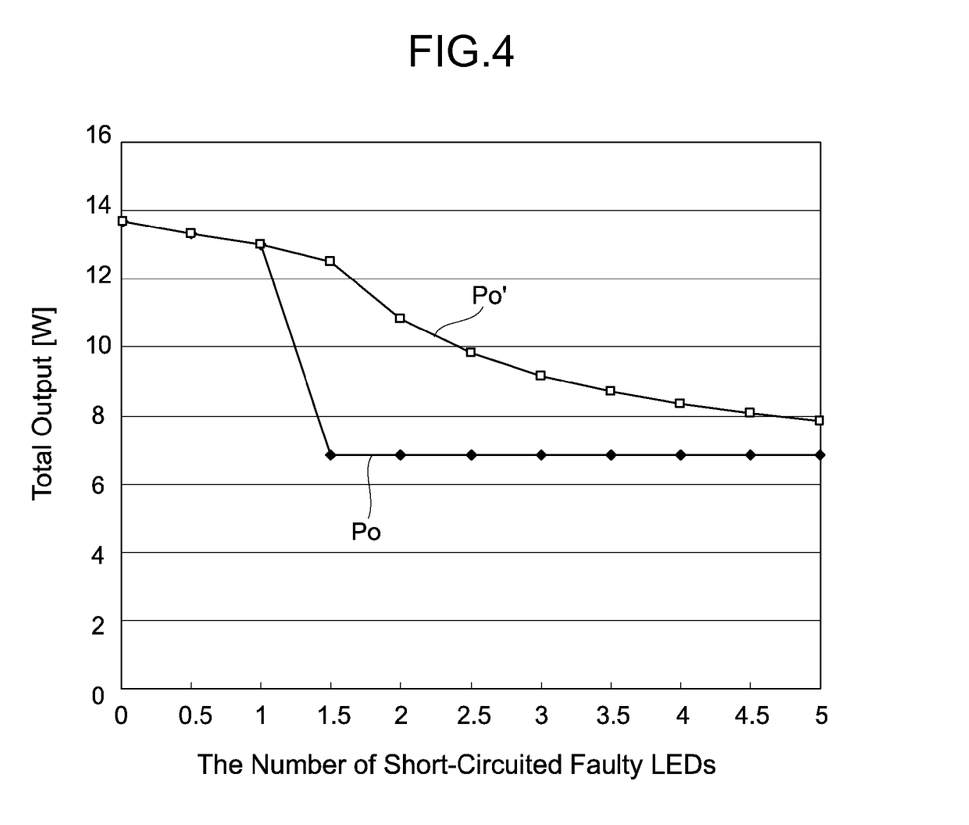
FIG. 4 is a graph showing a comparative result between the conventional example and the present invention, specifically showing a relation between the number of short-circuit LEDs and a total output of the device.

Next, differences between a conventional LED driver IC and the LED drive device 1 of the present embodiment are described hereunder with reference to a graph shown in FIG. 4. In addition, in FIG. 4, Po represents a correlation between the number of the LEDs that have developed a short-circuit fault and a total output in the conventional LED drive device. On the other hand, Po' represents a correlation between the number of the LEDs that have developed a short-circuit fault and a total output of the LED drive device in the present embodiment.

As described above, according to the LED drive device 1 proposed by the present embodiment shown in FIG. 2 and FIG. 3, when the LED rows 3A, 3B are driven under the normal operation, both the drain-source voltage Vds1 of the FET 31A and the drain-source voltage Vds2 of the FET 31B substantially become 0V. Here, if, for example, one LED 21B making up the LED row 3B has developed a short-circuit fault, the drain-source voltage Vds2 of the corresponding FET 31B is caused to increase by the amount of the forward voltage VF2 of the one LED 21B. At that time, when the current IF2 flowing through the LED row 3B is 180 mA and the forward voltage VF2 of the LED 21B is 3.8V, the power dissipation P in the FET 31B is calculated as 0.684 W, such power dissipation P being calculated using the aforementioned formula (P=Vds2×IF2). Further, if the allowable power dissipation of the FET 31B is 1 W for example, two LEDs 21B, 22B, for example, of the LED row 3B have developed a short-circuit fault, the power dissipation P in the FET 31B exceeds the allowable power dissipation of the FET 31B if allowing the IF2 to flow continuously.

According to the conventional LED driver IC, once it has been detected that the power dissipation P has exceeded the allowable power dissipation, the LED driver IC is protected by cutting off current supply to the LED row 3B having the LEDs 21B, 22B that have each developed the fault. The graph shown in FIG. 3 illustrates a characteristic of the total output power Po in the case of assuming the conventional LED driver IC. When the two LEDs 21B, 22B have developed a short-circuit fault, the current supply to the LED row 3B that has thus developed the fault is cut off to thereby cause the total output power Po of the LED driver IC to decrease by half, eventually reducing by half the luminance of the LED rows 3A, 3B as a whole.

Contrarily, with regard to the LED drive device 1 of the present embodiment, even when the two LEDs 21B, 22B have developed a short-circuit fault, the current IF2 is supplied as much as possible within the allowable power dissipation to thereby allow the remaining fault-free LEDs 23B-26B of the LED row 3B to be lighted, thus preventing the luminance of the LED rows 3A, 3B from being reduced by half as a whole. In FIG. 4, such operating status of the LED drive device 1 is expressed as the total output power Po'. Consequently, according to the present embodiment, the luminance of the whole of the LED rows 3A, 3B is higher than that of the conventional device. Specifically, the luminance of the whole of the LED rows 3A, 3B is higher than that of the conventional device by 58.5%, when the two LEDs 21B, 22B have developed a short-circuit fault.

As described above, in the present embodiment, there is provided the LED drive device 1 for applying, as a drive voltage, the reference voltage generated in the reference voltage generation circuit 5 to the LED row 3A composed of a plurality of the series-connected LEDs 21A-26A. The LED drive device 1 comprises the constant current circuit 7A and the power limiting circuit 6A. The constant current circuit 7A has the FET 31A, serving as a semiconductor element, series-connected to the LED row 3A, and controls the current flowing from the drain to the source of FET 31A by comparing the detected value obtained by the current detection resistor 32A detecting a current flowing through the LED row 3A with the reference value Vref1, thus keeping the current IF1 flowing through the LED row 3A constant. The power limiting circuit 6A operates so that when the LED 21A of the LED row 3A, for example, has developed a short-circuit fault and the electric power consumption of the FET 31A has thus become not less than a certain value, keeps the fault-free LEDs 22A-26A in the LED row 3A lighting and varies the reference value of the constant current circuit 7 in such a way that the power dissipation in the FET 31A remains lower than the allowable power dissipation of the FET 31A.

Specifically, when the LED 21A making up the LED row 3A, for example, has developed a short-circuit fault for any cause, a voltage equivalent to the forward voltage VF1 of the LED 21A that has developed a fault is applied to the FET 31A connected to the LED row 3A, thus causing the consumed power of the FET 31A to increase to not less than a certain value. At that time, the power limiting circuit 6A varies a potential of a connection point of the resistor 46A equivalent to the reference value of the constant current circuit 7A so that the actual power dissipation P in the FET 31A becomes lower than the allowable power dissipation of the FET 31A, thus permitting the power dissipation of the FET 31A, eventually the power dissipation of the LED drive device 1 having the FET 31A as its component to be effectively reduced. Further, the power limiting circuit 6A supplies a certain magnitude of the current IF1 to the LED row 3A so as to make remaining fault-free LEDs 22A-26A continue lighting. Therefore, when the LED 21A has developed a short-circuit fault, an adverse effect of halting the current supply to the LED row 3A can be swept away.

Further, when the LED 21A of the LED row 3A, for example, has developed a short-circuit fault and the electric power consumption by the FET 31A has thus become not less than a certain value, the power limiting circuit 6A varies the reference value of the constant current circuit 7 so as to be capable of flowing a maximal current within the actual power dissipation P in the FET 31A remains lower than the allowable power dissipation of the FET 31A.

As a result, when the LED 21A making up the LED row 3A, for example, has developed a short-circuit fault, the power limiting circuit 6A corresponding to the LED row 3A varies the potential of the connection point of the resistor 46A equivalent to the reference value of the constant current circuit 7A so that the current IF1 flowing through the FET 31A, eventually the current flowing through the LED row 3A is maximized within the range of allowing the actual power dissipation P of the FET 31A connected to the LED row 3A to remain lower than the allowable power dissipation of the FET 31A. Accordingly, it becomes possible for the remaining fault-free LEDs 22A-26A to continue to light up at as high a luminance as possible.

Further, the constant current circuit 7A in the present embodiment includes the current detection resistor 32A acting as the current detector for detecting the current flowing through the LED row 3A and besides the power limiting circuit 6A includes a multiplying circuit 41A acting as a calculator for calculating the electric power consumption of the FET 31A from the detected value obtained by the current detection resistor 32A and the drain-source voltage Vds1, being a voltage across the FET 31A.

Hence, the value of the current which is required for calculating the electric power consumption of the FET 31A and flows through the FET 31A can be obtained utilizing the current detection resistor 32A of the constant current circuit 7A, thus enabling the circuit configuration to be simplified.

Further, according to the LED drive device 1 of the present embodiment, there are connected a plurality of the LED rows 3A, 3B. The LED rows 3A, 3B are provided with the constant current circuits 7A, 7B and the power limiting circuits 6A, 6B, respectively.

As a result, even when the particular LED, e.g., the LED 21A of the LED row 3A has developed a short-circuit fault, the remaining LEDs 22A-26A of the LED row 3A keep on lighting, hence the decrease in the luminance of the whole of an LED unit comprising a plurality of the LED rows 3A, 3B can be minimized.

The present invention is not limited to the aforementioned embodiment. As a matter of fact, various modified embodiments are possible within the scope of the gist of the present invention. Although the aforementioned embodiment employs a plurality of the LED rows 3A, 3B . . . 3N, the concept of the present invention can also be applied to an LED drive device 1 having a single LED row 3 serving as a load.

Further, the constant current circuit 7A may be equipped with at least one or more semiconductor element for keeping the current flowing through the LED row 3 constant. For example, with regard to the constant current circuit 7A shown in FIG. 2, there is provided the op amp 33A for comparing the detected value obtained using the current detection resistor 33 with the value of the reference voltage from the output restriction circuit 6A. However, instead of using such op amp 33A, a comparator may be employed. In this case, the constant current circuit 7A includes the op amp 33A or the comparator for controlling the FET 31A by means of the voltage obtained by comparing the voltage of the detected value obtained in the current detection resistor 32A and the reference voltage, thereby enabling the constant current circuit 7A to be formed into the circuit configuration suitable particularly for a voltage-controlled semiconductor element.

Figure 5:
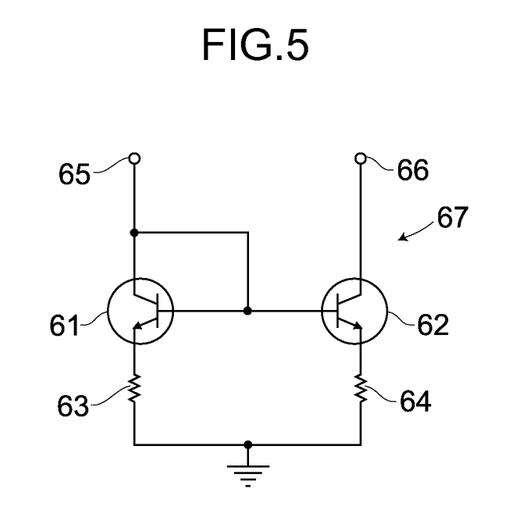
FIG. 5 is a circuit diagram illustrating a modified example in the present invention.

Otherwise, as shown in FIG. 5, a current mirror circuit 67 may be incorporated into the constant current circuit 7: the current mirror circuit 67 comprises two NPN transistors 61, 62 with bases thereof connected to each other and two resistors 63, 64 connected between the emitters of the transistors 61, 62 and a ground line. In the current mirror circuit 67, a base and a collector of the transistor 61 are short-circuited and an input terminal 65 into which a reference current flows is connected to the collector of the transistor 61, and an output terminal 66 from which an output current proportionate to the reference current outflows is connected to a collector of the transistor 62.

Figure 6:
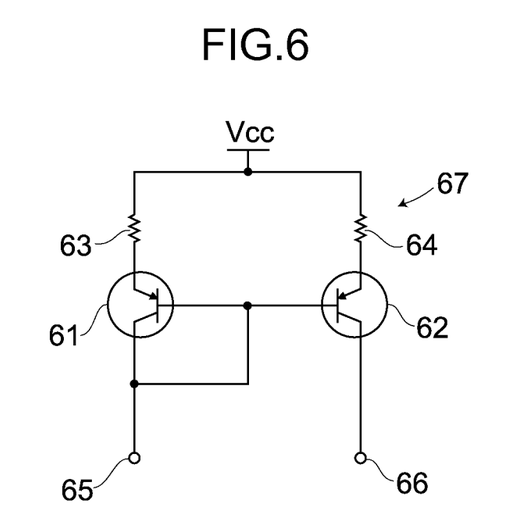
FIG. 6 is a circuit diagram illustrating another modified example in the present invention.

As another example of the current mirror circuit 67, there can also be employed a current mirror circuit, shown in FIG. 6, comprising two PNP transistors 61, 62 with bases thereof connected to each other and two resistors 63, 64 connected between emitters of the transistors 61, 62 and an operating voltage Vcc line, respectively. In such a current mirror circuit 67, the base and collector of the transistor 61 are short-circuited. Further, the input terminal 65 into which a reference current flows is connected to the collector of the transistor 61, and an output terminal 66 from which an output current proportionate to the reference current outflows is connected to the emitter of the transistor 62.

With regard to the circuit examples shown in both FIG. 5 and FIG. 6, when the reference current reflecting the current flowing through the LED row 3 and the power dissipation in the semiconductor element flows into the input terminal 65, the current proportionate to the reference current is caused to flow through the LED rows 3A, 3B connected to the output terminal 66. Therefore, in this case, the transistor 62 connected to the output terminal 66 serves as a semiconductor element of the constant current circuits 7A, 7B, supplanting the voltage-driven FETs 31A, 31B shown in FIG. 2 and FIG. 3.

In this case, the constant current circuits 7 includes the current mirror circuit 67 for flowing, through the transistor 62, a current proportional to a current value (a reference current) obtained by comparing the detected value of the current flowing through the LED row 3 and the reference value, being the power dissipation of the semiconductor element. Hence, the constant current circuits 7 can be formed into the circuit configuration suitable particularly for a current-controlled semiconductor element (e.g., the transistor 62).

Otherwise, a current transformer with lower power dissipation can be employed as the resistors 32A, 32B serving as current detectors. Furthermore, the power limiting circuit 7 is not limited to the circuit configurations shown in FIG. 2 and FIG. 3 and all circuit configurations may be employed which are capable of achieving the same functions as described above. Either packaged one like the conventional LED drive IC, or one formed by mounting the circuit elements shown in FIG. 2 on a printed-circuit board are available as the LED drive device 1 of the present embodiment.

What is claimed is:

1. An LED drive device applying a drive voltage to an LED row including a plurality of series-connected LEDs, comprising:
   a constant current circuit including a semiconductor element connected in series with said LED row to control said semiconductor element by comparing a detected value obtained by detecting a current flowing through said LED row and a reference value, thereby keeping a current flowing through said LED row constant, and
   a power limiting circuit for varying said reference value so that electric power consumption of said semiconductor element becomes lower than an allowable power dissipation of said semiconductor element with lighting-up of fault-free LEDs out of said LEDs making up said LED row retained, when said electric power consumption of said semiconductor element exceeds a preset value if any of the LEDs making up said LED row has developed a fault.

2. The LED drive device according to claim 1, wherein when electric power consumption of said semiconductor element exceeds said preset value, said power limiting circuit varies said reference value so as to enable a maximal current to flow into said semiconductor element within a range of electric power consumption lower than an allowable power dissipation of said semiconductor element.

3. The LED drive device according to claim 1, wherein said constant current circuit includes a current detector for detecting a current flowing through said LED row and said power limiting circuit includes a calculator for calculating electric power consumption of said semiconductor element using a detected value obtained by said current detector and a voltage across said semiconductor element.

4. The LED drive device according to claim 1, wherein said constant current circuit includes an op amp or a comparator for controlling said semiconductor element by a voltage obtained by comparing a voltage of said detected value and a voltage of said reference value.

5. The LED drive device according to claim 1, wherein said constant current circuit includes a current mirror circuit for flowing, through said semiconductor element, a current proportional to a current value obtained by comparing said detected value and the reference value.

6. The LED drive device according to claim 1, wherein a plurality of said LED rows is connected, and each of the plurality of said LED rows is provided with said constant current circuit and said power limiting circuit.

7. An LED illuminating device comprising said LED drive device and the plurality of said LED rows of claim 1, the plurality of said LED rows being incorporated together with said LED drive device.

8. The LED illuminating device according to claim 7, wherein when electric power consumption of said semiconductor element exceeds said preset value, said power limiting circuit varies said reference value so as to enable a maximal current to flow into said semiconductor element within the range of electric power consumption lower than an allowable power dissipation of said semiconductor element.

9. The LED illuminating device according to claim 7, wherein said constant current circuit includes a current detector for detecting a current flowing through said LED row and said power limiting circuit includes a calculator for calculating electric power consumption of said semiconductor element using a detected value obtained by said current detector and a voltage across said semiconductor element.

10. The LED illuminating device according to claim 7, wherein said constant current circuit includes an op amp or a comparator for controlling said semiconductor element by a voltage obtained by comparing a voltage of said detected value and a voltage of said reference value.

11. The LED illuminating device according to claim 7, wherein said constant current circuit includes a current minor circuit for flowing, through said semiconductor element, a current proportional to a current value obtained by comparing said detected value and the reference value.

12. The LED illuminating device according to claim 7, wherein a plurality of said LED rows is connected, and each of the plurality of said LED rows is provided with said constant current circuit and said power limiting circuit.

\* \* \* \* \*